United States Patent
Deutloff et al.

(10) Patent No.: US 8,662,263 B2
(45) Date of Patent: *Mar. 4, 2014

(54) SETTING DEVICE, PARTICULARLY A MOTOR VEHICLE PARKING BRAKE

(76) Inventors: Norbert Deutloff, Thüngersheim (DE); Ekkehard Kraft, Retzstadt (DE); Stephan Roos, Wertheim (DE); Armin Sauer, Arnstein (DE)

(*) Notice: Subject to any disclaimer, the term of this patent is extended or adjusted under 35 U.S.C. 154(b) by 781 days.

This patent is subject to a terminal disclaimer.

(21) Appl. No.: 10/596,686

(22) PCT Filed: Oct. 28, 2004

(86) PCT No.: PCT/EP2004/052705
§ 371 (c)(1),
(2), (4) Date: May 3, 2007

(87) PCT Pub. No.: WO2005/061293
PCT Pub. Date: Jul. 7, 2005

(65) Prior Publication Data
US 2007/0240950 A1 Oct. 18, 2007

(30) Foreign Application Priority Data
Dec. 22, 2003 (DE) .................. 103 61 127

(51) Int. Cl.
*F16D 65/14* (2006.01)
*B60L 7/00* (2006.01)

(52) U.S. Cl.
USPC .......................................... 188/162; 188/2 D (58) Field of Classification Search
USPC ........ 188/2 D, 161, 162, 166, 265, 72.8, 156; 74/89.34, 89.23; 296/26.13
See application file for complete search history.

(56) References Cited

U.S. PATENT DOCUMENTS 3,161,074 A * 12/1964 Korthaus et al. ............. 74/89.34
4,532,462 A   7/1985 Washbourn et al. ......... 318/372
(Continued)

FOREIGN PATENT DOCUMENTS

| DE | 44 34 401 C1 | 11/1995 | ............. F16H 25/20 |
| DE | 101 02 685 A1 | 8/2001 | ............. B60T 13/74 |
| WO | 98/56633 | 12/1998 | ............. B60T 13/74 |

OTHER PUBLICATIONS

International Search Report and the Written Opinion of the International Searching Authority, or the Declaration for Application No. PCT/EP2004/052705, 18 pages, Mar. 3, 2005.

(Continued)

*Primary Examiner* — Bradley King
*Assistant Examiner* — Stephen Bowes
(74) *Attorney, Agent, or Firm* — Westman, Champlin & Koehler, P.A.

(57) ABSTRACT

A setting device, particularly a motor vehicle parking brake, has a telescopic device (2; 3), which can be axially displaced by a setting unit (10) in a housing (1) or the like and which contains a hollow shaft (2) and a spindle shaft (3). This spindle shaft is axially connected to the hollow shaft in a manner that enables it to rotate and advance and actuates a brake cable (4). The setting device also has an axial advancing support between the hollow shaft (2) and the housing (1) via at least one elastic element (5) serving as a force sensor when the brake is pulled or in the event of a blocked brake release. According to one embodiment, a second elastic element (6) is provided for recognizing blocking of the brake cable (4) during an attempt to release the brake and, accordingly, after the release in tension of the first elastic element (5).

23 Claims, 10 Drawing Sheets

(56) References Cited

U.S. PATENT DOCUMENTS

| | | | | |
|---|---|---|---|---|
| 5,092,432 A | * | 3/1992 | Taig | 188/72.3 |
| 5,180,038 A | | 1/1993 | Arnold et al. | 188/171 |
| 5,775,469 A | * | 7/1998 | Kang | 188/267 |
| 7,648,006 B2 | * | 1/2010 | Deutloff et al. | 188/2 D |
| 2002/0084154 A1 | * | 7/2002 | Peter | 188/156 |
| 2003/0066714 A1 | * | 4/2003 | Flynn et al. | 188/2 D |
| 2003/0075001 A1 | * | 4/2003 | Petrak | 74/501.5 R |
| 2003/0227010 A1 | * | 12/2003 | Petrak | 254/294 |
| 2005/0115774 A1 | | 6/2005 | Nieto Gil et al. | 188/2 D |

OTHER PUBLICATIONS

Japanese Office Action (w/english abstract); Application No. 2006-546138; pp. 3, Jun. 25, 2009.

* cited by examiner

SETTING DEVICE, PARTICULARLY A MOTOR VEHICLE PARKING BRAKE

CROSS-REFERENCE TO RELATED APPLICATIONS

This application is a U.S. national stage application of International Application No. PCT/EP2004/052705 filed Oct. 28, 2004, which designates the United States of America, and claims priority to German application number DE 103 61 127.4 filed Dec. 22, 2003, the contents of which are hereby incorporated by reference in their entirety.

TECHNICAL FIELD

The invention relates to a setting device, particularly a motor vehicle parking brake.

BACKGROUND

An actuation mechanism for a brake with a brake cable which can be operated by an actuator via a spindle shaft and with a force sensor for determining the mechanical loading of the brake cable on application of the brake is known from DE 101 02 685 A1, in which the mechanical load on the brake cable via the actuator, decoupled from the brake cable, can be determined. The force sensor contains a spring screw arranged axially between the brake side end of the spindle shaft and a housing accommodating the actuation mechanism, of which the change in length on actuation of the spindle shaft to apply the brake is measured by a Hall chip within the spring screw and serves as a measure for the force exerted on the brake cable when the brake is applied.

SUMMARY

According to the object of the present invention, using a mechanism of the type described above as its starting point, a setting device is to be created which stands out by virtue of its compact design and makes it possible in a simple manner also to measure the brake cable force when the brake is released, especially if blocking occurs.

The aforementioned object can be achieved by a setting device comprising a setting unit featuring a remotely-operated drive, a telescopic device movable axially in a housing or similar in a longitudinal axis of the setting unit, containing a hollow shaft and a spindle shaft connected to it in a manner that enables it to rotate and advance and actuate a brake cable, a non-rotating axially movable connection between the remotely-operated drive and the hollow shaft, and an axial advancing support between the hollow shaft on the one side and the housing on the other side via at least one elastic element stationary relative to the spindle shaft and the brake cable and arranged in parallel in the direction of hollow shaft loaded axially by the advancing support and thereby axially deformable.

The object can also be achieved by a motor vehicle parking brake, comprising a drive unit featuring a remotely-operated drive, a telescopic device movable axially in a housing or similar in a longitudinal axis of the setting unit, containing a hollow shaft and a spindle shaft connected to it in a manner that enables it to rotate and advance and actuate a brake cable, a non-rotating axially advancable connection between the remotely-operated drive and the hollow shaft, and an axially advancing support between the hollow shaft on the one side and the housing one the other side via at least elastic element stationary relative to the spindle shaft and the brake cable during a drive into the release position of the brake of an axially loaded and thereby axially longitudinally deformable elastic element.

A setting device may further comprise an electric motor for the remotely-operated drive and/or a transmission between the remotely-operated drive and the hollow shaft. A setting device may further comprise an intermediate gear wheel between a drive gear element of the remotely-operated drive and a drive gear wheel of the hollow shaft; and an axial movement option between the intermediate gear wheel and the meshing drive gear wheel of the hollow shaft at least to the extent of the operational stroke distance of the at least one elastic element. A setting device may further comprise a force sensor receiver which is stationary relative to the spindle shaft and the brake cable and assigned to a force sensor emitter and which can be in the form of a Hall chip assigned to the magnetic force sensor emitter. A setting device may further comprise an arrangement of the force sensor receiver as an integrated part of a control unit of the setting unit, which can be accommodated by a fixed circuit board. The control unit can be arranged in the area of the telescopic device. The at least one elastic element can be embodied as a spring screw. The at least one elastic element can be arranged or embodied as a spring screw surrounding the hollow shaft concentric to the hollow shaft or the spindle shaft especially in its opposite direction of rotational advance. The at least one elastic element can be embodied as a compression spring element. At least one elastic element can be embodied as a tension spring element. The at least one elastic element can be used with a force sensor emitter for determining the brake application force of a motor vehicle parking brake. The at least one elastic element can be used with a force sensor emitter for determining the brake release force of a motor vehicle parking brake. A first elastic element can be loaded axially by advancing support for an axial advancing movement of the telescopic device, on application of a motor vehicle parking brake; and a second elastic element can be loaded axially in the other axial direction of movement of the telescopic device by advancing support, on release of a motor vehicle parking brake. A setting device may further comprise a different elasticity constant of the first elastic element by comparison with the elasticity constant of the second elastic element. A setting device may further comprise a loading of the second elastic element after previous unloading of the first elastic element. A setting device may further comprise a zero point detection between the transition of the unloading of the first elastic element on the one hand and the loading of the second elastic element on the other hand. A setting device may further comprise an arrangement of the second elastic element axially before or after the first elastic element. A setting device may further comprise a concentric arrangement in relation to each other of the first elastic element and of the second elastic element. A setting device may further comprise an embodiment of the at least one elastic element as a pressure compression element, with different compression spring constants by comparison with the tension spring element constant.

The arrangement of the elastic element in the area of the hollow shaft, especially in the form of a spring screw concentrically surrounding the hollow shaft and the spindle shaft, allows a compact design, in particular an axial design, to be easily achieved.

By embodying the at least one elastic element both as a compression spring element and also as a tension spring element, a force measurement and thereby brake cable monitoring is advantageously made possible both on application and also on release of the brake; In accordance with an advantageous embodiment of the invention, it is possible to separate the application force measurement from the release force measurement while retaining a compact design by using two spring screws arranged concentrically to each other. A further separation option while retaining a compact design is advantageously possible by arranging the second elastic element in the space to be kept free for the lifting movement of the spindle shaft, with the end of the spindle shaft being able to penetrate into the interior of the elastic element embodied as the spring screw.

The parallel, especially concentric, compact and simple design provided by the arrangement of the at least one elastic element can be even further refined by a force sensor receiver assigned to the force sensor emitter moved on axial deformation of the support being able to be fixed or contacted in the vicinity of the telescopic device, e.g. integrated on a shared circuit board, without the need for longer lines laid to provide flexibility.

BRIEF DESCRIPTION OF THE DRAWINGS

The invention as well as further advantageous embodiments in accordance with features of the subclaims are explained in more detail below with reference to schematic exemplary embodiments in the drawing; The Figures show:

DETAILED DESCRIPTION

The following major components of the inventive setting device are accommodated by a housing 1 with an axially enclosing housing cover 1.1: An axially movable telescopic unit 2;3 containing a hollow shaft 2 and a spindle shaft 3 connected to this in a manner that allows it to rotate and advance and actuate a brake cable 4, as well as a setting unit 10 for the telescopic unit 2;3 with an electric motor 8, which, with a worm shaft 8.2 as part of its rotor shaft 8.1, drives a transmission gear wheel 2.1 which can be moved axially to it and is connected in a fixed manner to the hollow shaft 2 in a fixed drive connection via an intermediate gear wheel 11.

An elastic element 5 in the form of a spring screw concentrically enclosing the hollow shaft 2 or the spindle shaft 3 is provided as the advancing support for the hollow shaft 2, which as a compression spring rests with one of its ends via an axial thrust washer 9 against a shoulder of the housing 1 and with its other axial end on a force sensor emitter 2.2 with a fixed connection to the hollow shaft 2.

When the telescopic device 2; 3 is driven in the sense of a movement of the brake cable 4 to the right, i.e. in the sense of applying a motor vehicle parking brake not shown in any greater detail here, the elastic element 5 is compressed by being pressed against the axial bearing 9; Simultaneously, in accordance with the compression of the elastic element, the force sensor emitter 2.2. moves to the left; the distance covered here is thus a measure of the application force or brake force exerted on the brake cable 4 by the electric motor 8 via the gearing, the hollow shaft 2 and the spindle shaft 3.

Figure 1:
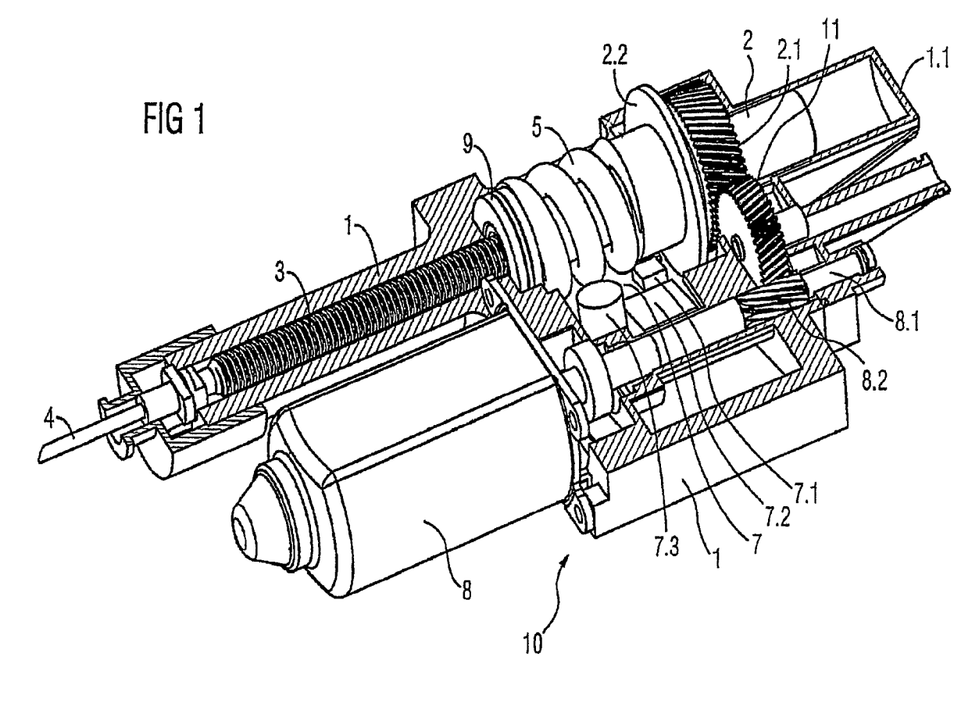
FIG. 1 an inventive setting device in a perspective axial part longitudinal section.
Figure 2:
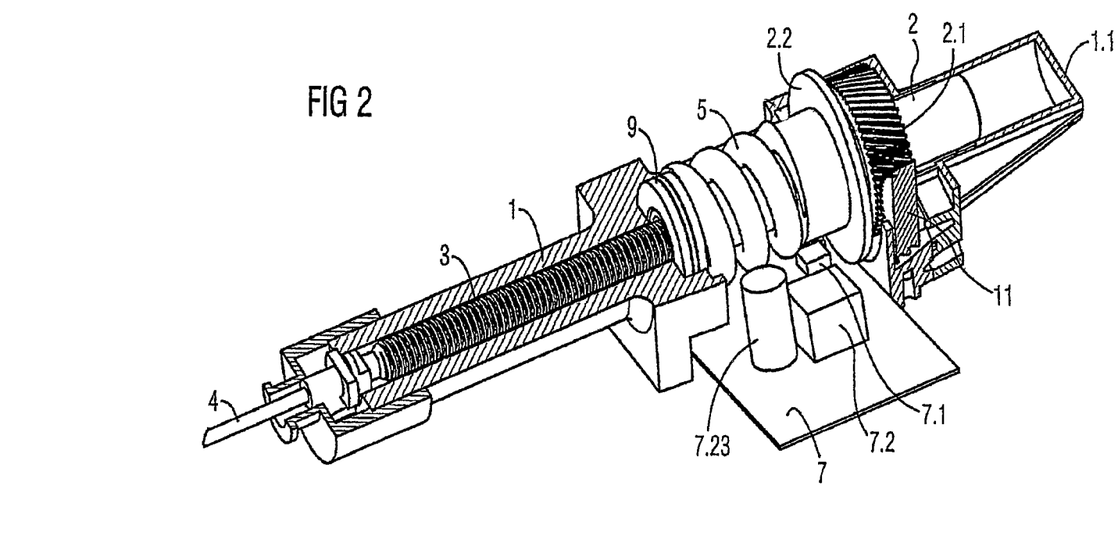
FIG. 2 the setting device shown in FIG. 1 with the control unit and force sensor unit removed for the sake of clarity.

In addition to the force sensor emitter 2.2, especially in the form of a ferromagnetic disk, a force sensor receiver 7.1 assigned to this emitter, especially in the form of a Hall chip, serves to determine the spring path during the support compression of the elastic element 5, especially in the form of spring screw. The force sensor receiver 7.1 is designed for simple manufacturing without the need for flexible lines and designed to exploit the compact available free space in the area of the elastic element 5 within the housing 1—as can especially be seen from FIG. 2—and an integrated component of a control unit 7.2; 7.3 for the setting device 10 preferably containing further electrical or electronic components 7.2 or 7.3, preferably accommodated on a control unit circuit board 7.

The constructive of functional relationship of the components described in basic terms above is explained in greater detail below with reference to different operating states of a parking brake when the brake is applied and/or released.

Figure 3:
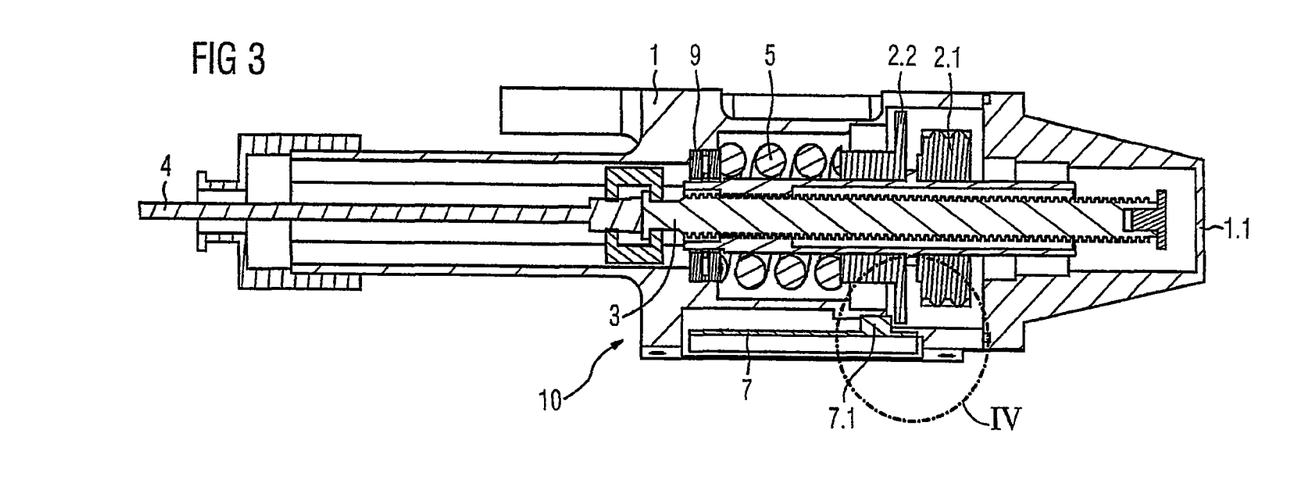
FIG. 3, 4 the setting device according to FIG. 1 with the brake cable applying the brake in an overall axial longitudinal section and in an enlarged section in the force sensor area.

FIG. 3 shows an inventive setting device for a motor vehicle parking brake in the brake position with the brake applied, i.e. the brake cable 4 moved to the right; to do this a torque is transmitted from the electric motor 8 via its worm shaft 8.2 via the intermediate gear wheel 11 to the transmission drive wheel 2.1 permanently connected to the hollow shaft 2 functioning concentrically with it as a spindle nut An axial advancing movement is exerted on this spindle shaft 3 via the inner thread of the hollow shaft 2 via the outer thread of the spindle shaft 3 which meshes with it in the sense of an application of the parking brake by the brake cable 4. When the brake cable applies the brake 4 through the movement of the spindle shaft 3 into the brake setting shown in FIG. 3, the hollow shaft 2 is supported on the housing 1 via the elastic element 1 in the form of a spring screw concentrically surrounding the hollow shaft 2 or the inner meshing spindle shaft 3; to this end the elastic element, preferably as a compression spring, lies with its right-hand free end on the force sensor emitter 2.2 preferably permanently connected to the hollow shaft 2 and with its left-hand end via an axial thrust washer 9 on a shoulder of the housing 1.

Figure 4:
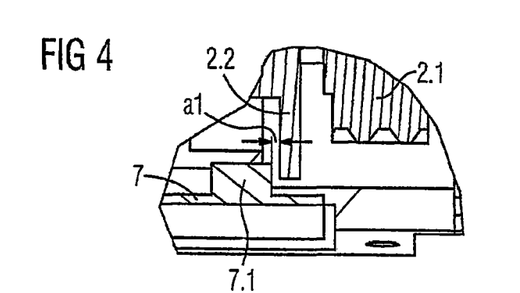

When the brake cable 4 is pulled on the elastic element 5 is compressed in proportion to the force exerted here on the brake cable 4 via the spindle shaft 3; the hollow shaft 2 or the gearing drive wheel 2.1 permanently connected to it is in this case accordingly able to be moved axially relative to the intermediate gear wheel 11. The path corresponding to this compression deformation of the elastic element 5 is—according to the enlarged section in FIG. 4—recorded as the dimension a1 between the force sensor emitter 2.2 which is also moved on the one hand and the assigned, force sensor receiver 7.1 which remains stationary and is recorded in the control unit advantageously also arranged on the same control unit circuit board 7 for the setting unit 10 and processed into a representative brake force measurement variable.

Figure 5:
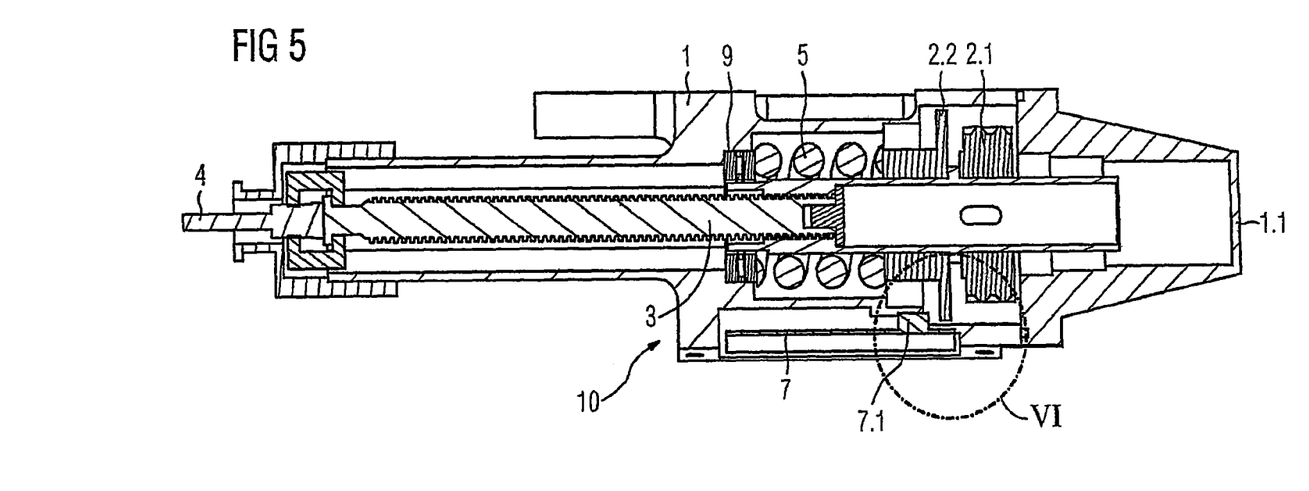
FIGS. 5, 6 the setting device according to FIGS. 3, 4 with the brake cable released in a overall axial longitudinal cross section and in an enlarged section in the force sensor area.
Figure 6:
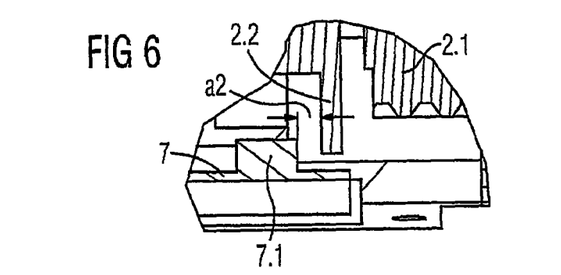

FIG. 5 shows the setting device according to FIG. 3 with released parking brake with spindle shaft 3 with brake cable 4 correspondingly moved into a left-hand release position; There is no load on the elastic element 5, correspondingly—according to the enlarged section in FIG. 6—the force sensor emitter 2.2 has increased its distance to the force sensor receiver 7.1 to a dimension a2.

As additions to the previous examples, FIG. 7, 8 or FIG. 9, 10 show a second elastic element 6 which is assigned to the release movement of the brake cable 4 and which monitors the cable for a correct execution sequence, especially for detection of a blocking case.

Figure 7:
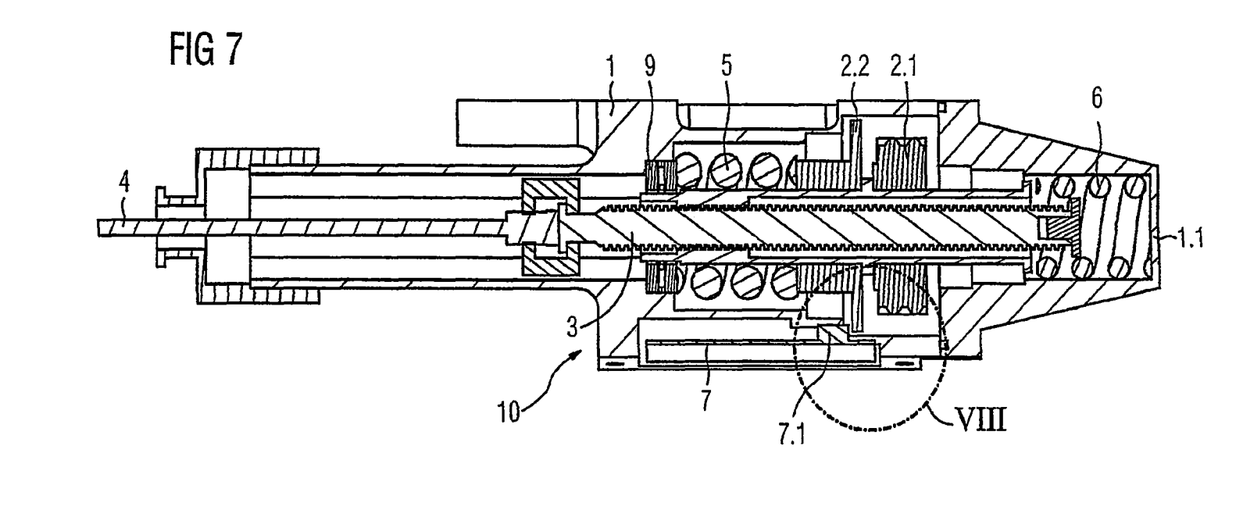
FIGS. 7, 8 the setting device according to FIG. 1 in the brake setting with a first elastic element for brake application sensing and second elastic element supported axially to it for brake release sensing in an overall axial longitudinal cross section and in an enlarged section in the force sensor area.
Figure 8:
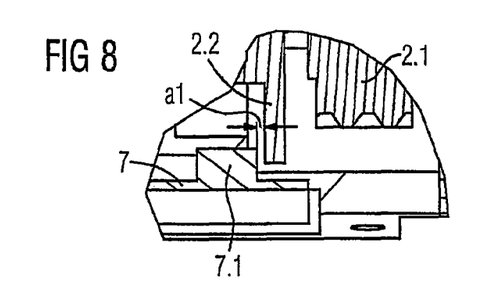

FIG. 7, 8 show a correct brake setting with the spindle shaft 3 moved into a right-hand brake setting in accordance with FIG. 7 and a dimension a1 corresponding to a defined pressure load of the first elastic element 5 between the force sensor emitter 2.2 on the one side and the force sensor receiver 7.1 on the other side according to FIG. 8. The second elastic element 6 is not subject to any load. A compact design is achieved by the right-hand end of the spindle shaft 3 being able to move within a spring screw provided as an elastic element 6 and thereby advantageously no additional space being needed.

Figure 9:
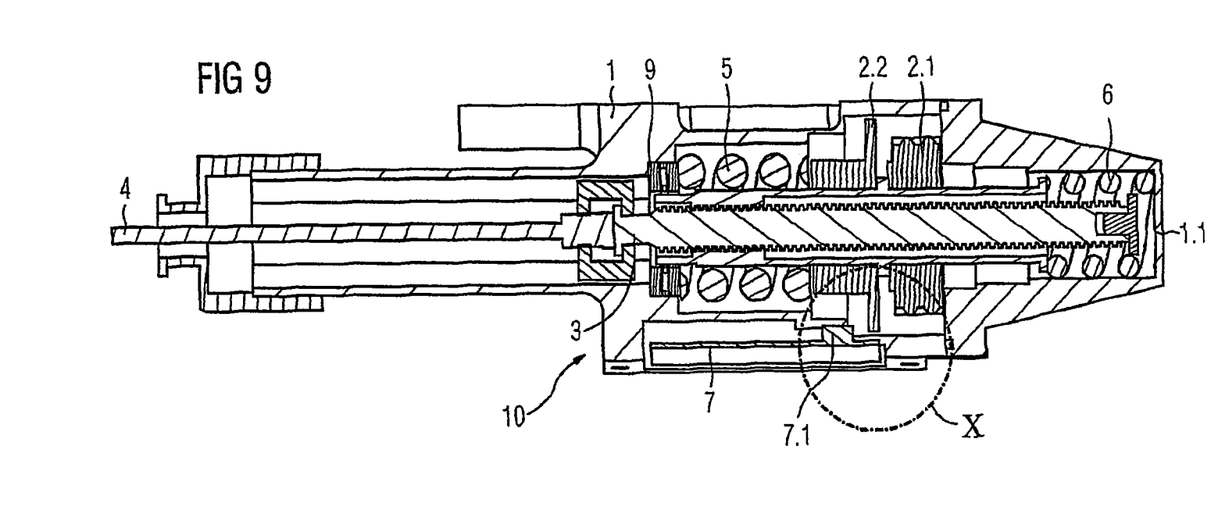
FIGS. 9, 10 the setting device according to FIGS. 7, 8 with a brake cable blocked on attempted release in an overall axial longitudinal cross section and in an enlarged section in the force sensor area.
Figure 10:
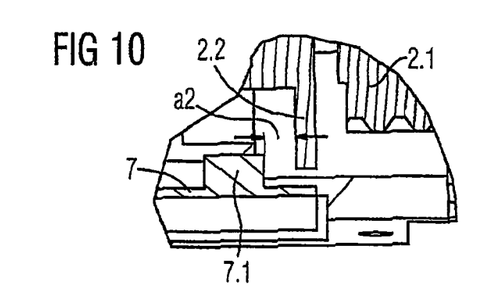

FIGS. 9, 10 now explain an attempt to release the brake when blocking of the brake cable 4 has occurred—e.g. caused by it icing up. In the attempted release the spindle shaft 3 and the hollow shaft 2 move by a small amount—documented by the difference of the dimension a1 according to FIG. 8 compared to the dimension a2 according to FIG. 10, with the hollow shaft 2 hitting the second elastic element 6 and causing this to compress and a defined force analysis being enabled via the processing of the dimension a2.

FIGS. 11, 12 or FIGS. 13, 14 show a further inventive embodiment with a first elastic element 5 for measuring brake application force and also a second elastic element 6 for measuring brake release force. Both elastic elements are embodied as screw springs and engage concentrically to each other with the hollow shaft 2 or the spindle shaft 3 in a compact design in the area of the control unit 7.2; 7.3.

Figure 11:
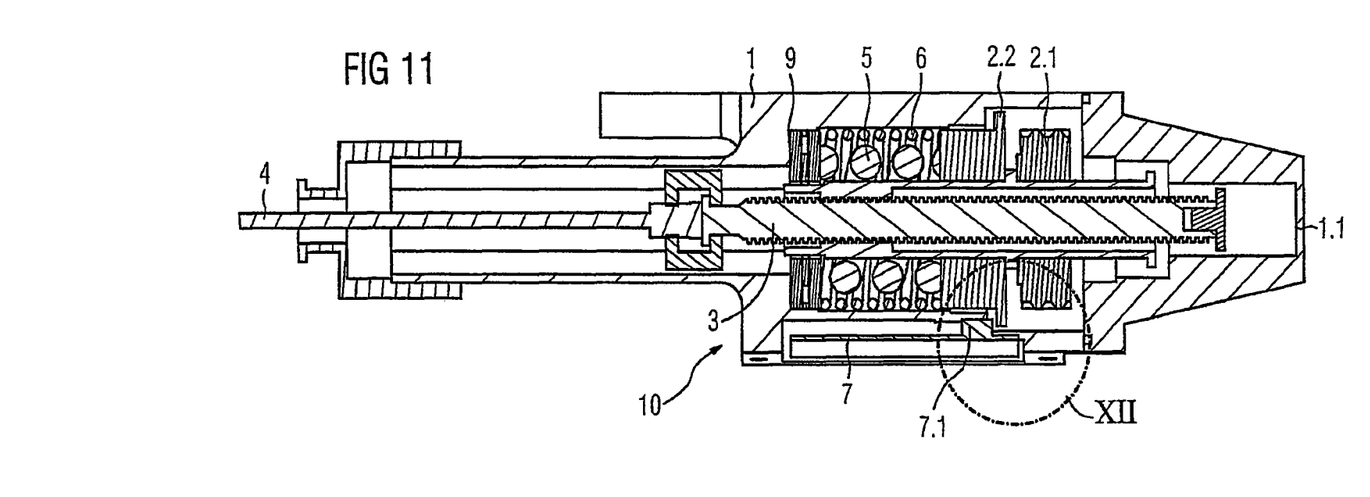
FIGS. 11, 12 the setting device to FIG. 1 in the brake setting with a first elastic element for brake application sensing and a second elastic element concentric with it for brake release sensing in an overall axial longitudinal cross section and in an enlarged section in the force sensor area.
Figure 12:
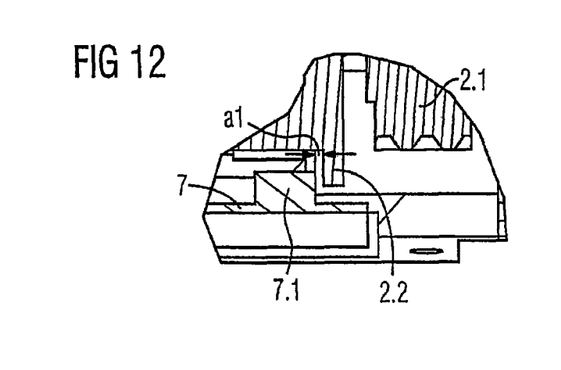
Figure 13:
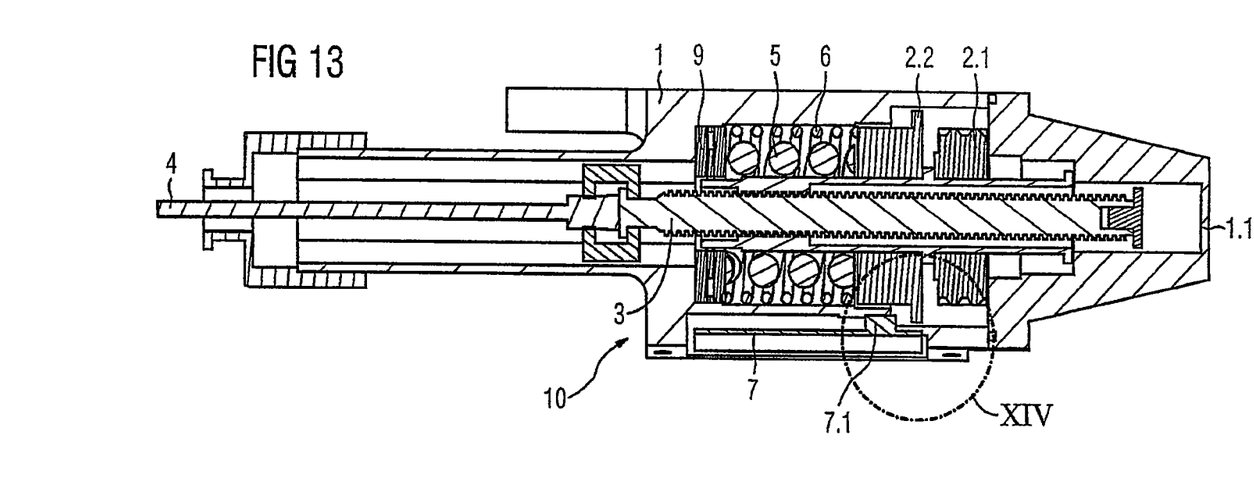
FIGS. 13, 14 the setting device according to FIGS. 11, 12 with a brake cable blocked on attempted release in an overall axial longitudinal cross section and in an enlarged section in the force sensor area.
Figure 14:
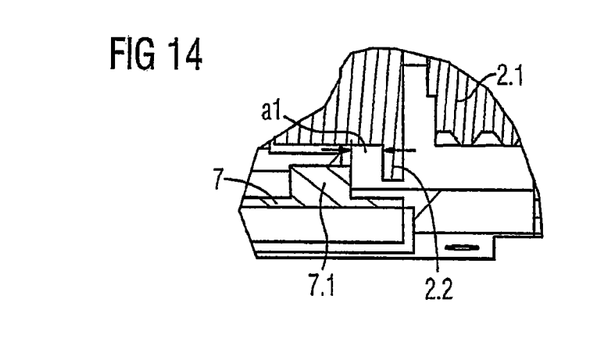

FIG. 11 shows the brake setting with the spindle shaft 3 driven to the right into its end brake setting and according to FIG. 12 with the corresponding dimension a1 between the force sensor emitter 2.2 on one side and the assigned force sensor receiver 7.1 on the other side. The second elastic element 6 is in this case connected in parallel to the first elastic element 5 in order to have the same effect, however according to one embodiment of the invention is provided with a different spring characteristic such that a support for the advancing movement resulting from the spring force compression only remains if, as assumed in FIGS. 13, 14—e.g. by reversing the direction of rotation of the electric motor—the drive of the hollow shaft 2 and the spindle shaft 3 is undertaken in the sense of a brake release movement of the brake cable 4 and through this the larger dimension a2 according to FIG. 14 is produced. As can be seen from FIG. 11, at the right-hand end of the hollow shaft 2 there is a stop, especially provided on the housing cover 1.1, by which it is possible to prevent the axial movement of the hollow shaft 2 exceeding the maximum spring travel of the second elastic element 6; through a corresponding axial play before the stop of the hollow shaft 2 a clear identification of the zero point between the end of the loading of the first elastic element 5 and the continuing load pressure on the second elastic element 6 on transition to the release attempt according to FIG. 13, 14 is possible in a simple manner; A further clarification is provided according to an embodiment by selecting different elasticity or spring constants of the elastic element 5 or 6.

FIGS. 15, 16 or FIGS. 17, 18 show the inventive solution according to claim 22 for a setting direction with only one monitoring of the release movement of the parking brake.

Figure 15:
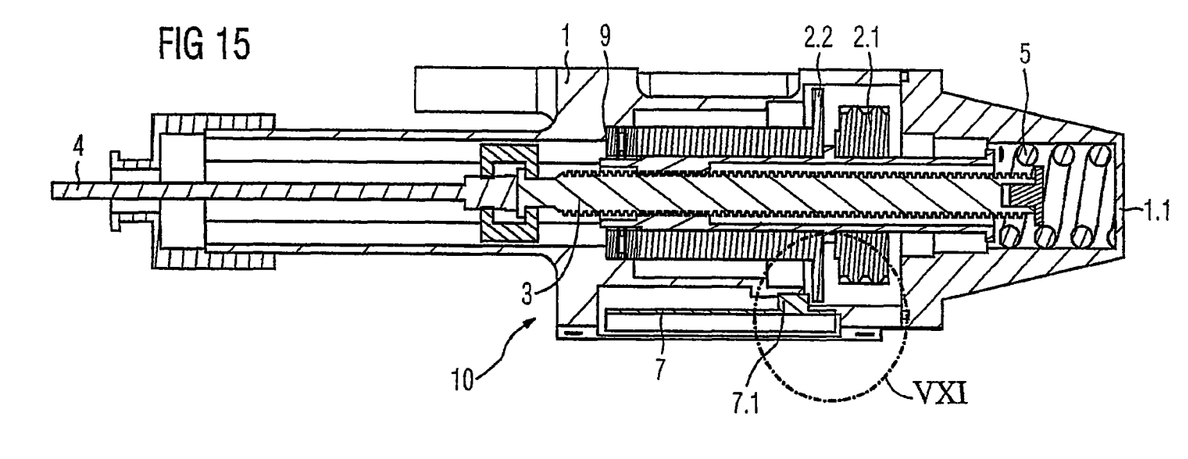
FIGS. 15, 16 the setting device in accordance with FIG. 1 with a single elastic element for brake release sensing with the brake cable applied in an overall axial longitudinal cross section and in an enlarged section in the force sensor area.
Figure 16:
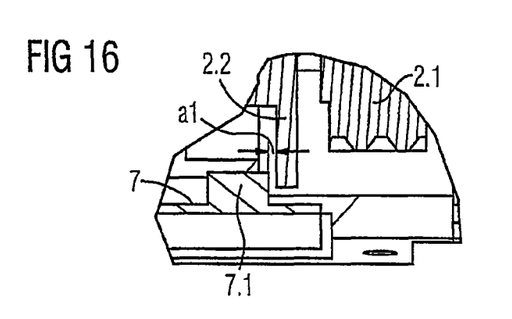

FIG. 15 additionally shows the spindle shaft 8 in its right-hand brake setting with brake cable 4 pulled on. The hollow shaft 2 is supported via the force sensor emitter 2.2 and the axial bearing 9 on the housing 1; the corresponding dimension a1 is also specified in the enlarged section according to FIG. 16.

Figure 17:
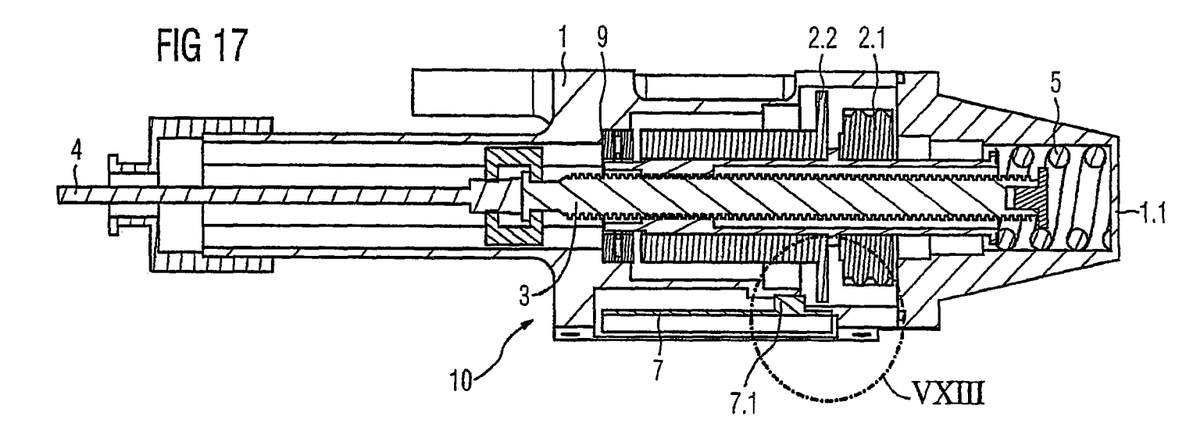
FIGS. 17, 18 the setting device in accordance with FIGS. 15, 16 with the brake cable blocked on attempted release in an overall axial longitudinal cross section and in an enlarged section in the force sensor area.
Figure 18:
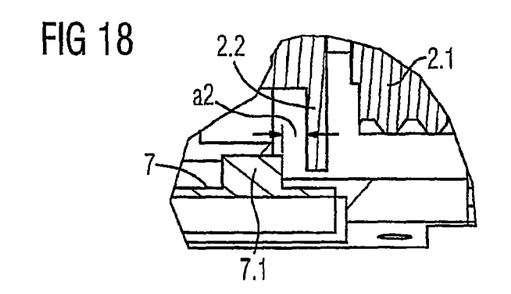

FIGS. 17, 18 illustrate the detection of blocking of the brake cable 3 when an attempt is made to release the brake. The blocked brake cable 4 presses the spindle shaft 3 as well as the hollow shaft 2 to the right against the elastic element 5; accordingly the force sensor emitter 2.2 moves by the increased dimension a2 in relation to the force sensor receiver 7.2. Force sensor-receiver 7.2 and hollow shaft 2 in this case no longer rest against the left-hand shoulder of the housing 1.

The invention relates to a setting device, especially for a motor vehicle parking brake, with a telescopic device 2; 3 containing a hollow shaft 2 a spindle shaft 3 with an axial rotary advancing connection to it which operates a brake cable 4 movable axially in a housing or such like, as well as with an axial advancing movement support between the hollow shaft 2 and the housing 1 via at least one elastic element 5, which serves as a force sensor for a brake application or a blocked brake release; according to one embodiment a second elastic element 6 is provided for blocking detection of the brake cable 4 on an attempt to release the brake and according after the tension on the first elastic element 5 is released.

What is claimed is:

1. A setting device comprising
a remotely-operated drive,
a hollow shaft connected to the remotely-operated drive through at least one gear such that the remotely-operated drive rotates the hollow shaft;
a spindle shaft located within the hollow shaft and connected to a brake cable such that the spindle shaft is moved axially within the hollow shaft by the rotation of the hollow shaft and thereby actuates a brake through the brake cable; and
an elastic element concentrically surrounding the hollow shaft such that a load on the elastic element increases as the spindle shaft actuates the brake.

2. The setting device according to claim 1, comprising an electric motor for the remotely-operated drive.

3. The setting device according to claim 1, wherein the elastic element is embodied as a spring screw.

4. The setting device according to claim 1, wherein the at least one elastic element is embodied as a compression spring element.

5. The setting device according to claim 1, comprising a concentric arrangement in relation to each other of the elastic element and of the second elastic element.

6. The setting device according to claim 1, comprising a transmission between the remotely-operated drive and the hollow shaft.

7. The setting device according to claim 6, comprising
an intermediate gear wheel between a drive gear element of the remotely-operated drive and a drive gear wheel of the hollow shaft,
the intermediate gear wheel and the drive gear wheel of the hollow shaft being enabled to move axially relative to each other at least to the extent of an operational stroke distance of the at least one elastic element.

8. The setting device according to claim 1, further comprising a force sensor emitter fixed to the hollow shaft and moving as the elastic element is deformed.

9. The setting device according to claim 8, wherein the force sensor emitter is used for determining a brake application force of a motor vehicle parking brake.

10. The setting device according to claim 8, wherein the force sensor emitter is used for determining a brake release force of a motor vehicle parking brake.

11. The setting device according to claim 8, further comprising
a force sensor receiver which is stationary relative to a housing and assigned to the force sensor emitter.

12. The setting device according to claim 11, wherein:
the force sensor receiver is in the form of a Hall chip assigned to the force sensor emitter.

13. The setting device according to claim 11, comprising:
an arrangement of the force sensor receiver as an integrated part of a control unit of a setting unit, which is accommodated by a fixed circuit board.

14. The setting device according to claim 11, comprising an arrangement of the force sensor receiver as an integrated part of a control unit of a setting unit.

15. The setting device according to claim 14, wherein the control unit is arranged in the area of the hollow shaft.

16. The setting device according to claim 1, wherein a second elastic element is loaded axially as the spindle shaft releases the brake.

17. The setting device according to claim 16, wherein the elastic element has an elasticity constant that is different from an elasticity constant of the second elastic element.

18. The setting device according to claim 16, comprising a loading of the second elastic element after previous unloading of the elastic element.

19. The setting device according to claim 16, comprising a zero point detection between the transition of the unloading of the elastic element on the one hand and the loading of the second elastic element on the other hand.

20. The setting device according to claim 16, comprising an arrangement of the second elastic element axially before or after the elastic element.

21. A motor vehicle parking brake, comprising
a drive unit featuring a remotely-operated drive,
a hollow shaft driven by the drive unit so that the hollow shaft rotates;
a spindle shaft that advances within the hollow shaft due to the rotation of the hollow shaft, the spindle shaft connected to a brake cable such that the spindle shaft actuates a brake as it advances within the hollow shaft; and
an elastic element positioned such that movement of the hollow shaft caused by a force arising from the advancing movement of the spindle shaft as it actuates the brake loads the elastic element.

22. A setting device comprising:
a remotely-operated drive,
a gearing wheel driven by rotation of the remotely-operated drive and permanently connected to a hollow shaft such that the hollow shaft is rotated by rotation of the remotely-operated drive and such that the gearing wheel and the hollow shaft can be moved along an axis of the hollow shaft relative to the remotely-operated drive;
a spindle shaft connected to a brake cable and located within the hollow shaft such that the spindle shaft moves axially within the hollow shaft due to rotation of the hollow shaft; and
an elastic element positioned between the hollow shaft and a housing, arranged in parallel with the hollow shaft and loaded axially by the hollow shaft during the axial movement of the spindle shaft.

23. A motor vehicle parking brake, comprising:
a remotely-operated drive,
a gearing wheel driven by rotation of the remotely-operated drive and permanently connected to a hollow shaft such that the hollow shaft is rotated by rotation of the remotely-operated drive and such that the gearing wheel and the hollow shaft can be moved along an axis of the hollow shaft relative to the remotely-operated drive;
a spindle shaft connected to a brake cable and located within the hollow shaft such that the spindle shaft moves axially within the hollow shaft due to rotation of the hollow shaft; and
an elastic element positioned between the hollow shaft and a housing and arranged in parallel with the hollow shaft and loaded axially by the hollow shaft during the axial movement of the spindle shaft.

\* \* \* \* \*

UNITED STATES PATENT AND TRADEMARK OFFICE
CERTIFICATE OF CORRECTION

PATENT NO. : 8,662,263 B2  
APPLICATION NO. : 10/596686  
DATED : March 4, 2014  
INVENTOR(S) : Deutloff et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1187 days.

Signed and Sealed this

Twenty-ninth Day of September, 2015

Michelle K. Lee
*Director of the United States Patent and Trademark Office*